United States Patent [19]

Roe

[11] Patent Number: 4,821,109
[45] Date of Patent: Apr. 11, 1989

[54] GENERATING HALF-TONE REPRESENTATIONS

[75] Inventor: Malcolm D. M. Roe, Herts, England

[73] Assignee: Wisconsin Alumni Research Foundation, Madison, Wis.

[21] Appl. No.: 123,623

[22] Filed: Nov. 17, 1987

[30] Foreign Application Priority Data

Nov. 26, 1986 [GB] United Kingdom ............... 8628238

[51] Int. Cl.$^4$ ..................... H04N 1/024; H04N 1/23
[52] U.S. Cl. ................................... 358/253; 358/280
[58] Field of Search .............. 358/283, 293, 282, 284, 358/298, 280

[56] References Cited

U.S. PATENT DOCUMENTS

| | | | |
|---|---|---|---|
| 3,562,420 | 2/1971 | Thompson | 178/6 |
| 3,681,650 | 8/1972 | Koll | 315/30 |
| 3,916,096 | 10/1975 | Everett et al. | 358/283 |
| 4,040,094 | 8/1977 | Everett et al. | 358/283 |
| 4,196,454 | 4/1980 | Warren | 358/283 |
| 4,447,833 | 5/1984 | Sano | 358/298 |
| 4,450,485 | 5/1984 | Oshikoshi et al. | 358/298 |
| 4,578,714 | 3/1984 | Sugiura et al. | 358/283 |
| 4,686,579 | 8/1987 | Sakamoto | 358/282 |
| 4,700,235 | 10/1987 | Gall | 358/283 |
| 4,727,434 | 2/1988 | Kawamura | 358/280 |
| 4,733,230 | 3/1988 | Kurihara | 358/283 |

FOREIGN PATENT DOCUMENTS

| | | |
|---|---|---|
| 0141869 | 5/1985 | European Pat. Off. |
| 2007849 | 1/1970 | France |
| 2026283 | 1/1980 | United Kingdom |
| 2091518 | 7/1982 | United Kingdom |

Primary Examiner—James J. Groody
Assistant Examiner—Jerome Grant, II
Attorney, Agent, or Firm—Lathrop & Clark

[57] ABSTRACT

A method and apparatus for generating a half-tone representation of an original image is described. The apparatus comprises an exposing beam generator (8); a record medium support (11); and a mirror (10) for causing an exposing beam generated by the beam generator (8) to scan a record medium mounted on the support (11). An exposing beam control system (5) generates a two state control signal (CS) to control the condition of the exposing beam, the control signal being generated in accordance with a picture signal (PS) representing color component densities of the original image and half-tone dot information (PV) defining for elemental areas within a dot cell corresponding values representative of color densities whereby elemental areas of the record medium are exposed or not exposed in use according to the control signal taking up a first or second state respectively. The control signal is generated by making use of a probability function which introduces a random element into the choice of elemental areas at the edge of a half-tone dot, but which ensures that, although each half-tone dot will not itself accurately define the required color density, an area of such dot will on average define the required dot density with the further feature that within that area, the dots will have a variety of different shapes.

7 Claims, 3 Drawing Sheets

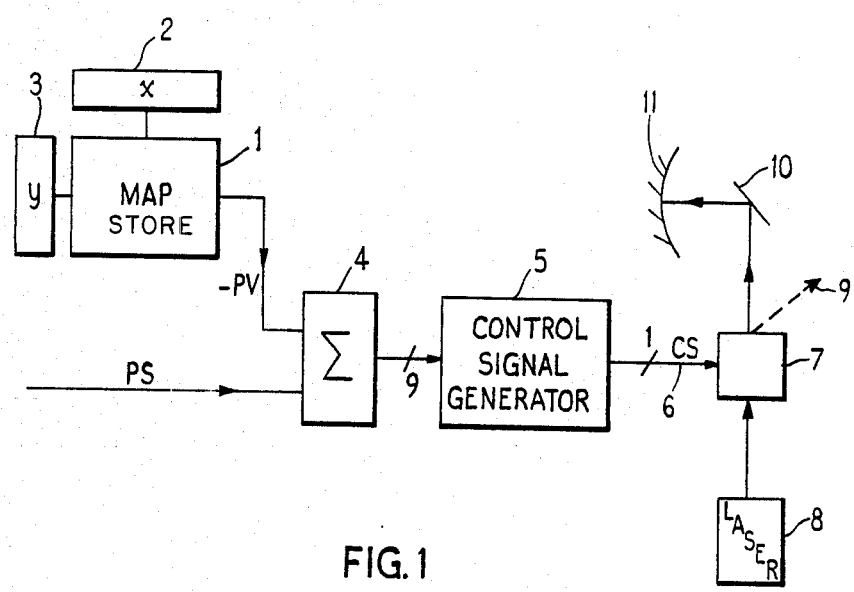

GENERATING HALF-TONE REPRESENTATIONS

FIELD OF THE INVENTION

The invention relates to methods and apparatus for generating half-tone representations of an original picture.

DESCRIPTION OF THE PRIOR ART

In our European patent application No. 0047145 we described an electronic dot generator in which a set of six overlapping exposing beams scan across a record medium and are controlled to expose selected portions of the record medium to generate a half-tone dot representation of an original picture. A store is provided containing a map of each dot area from which a control signal is derived to control the condition of each exposing beam. The store defines for each elemental area of a half-tone dot area a value indicating the minimum colour density for which the exposing beam should expose the record medium at that position within the half-tone dot area. An elemental area has a width corresponding to a beam width and a length dependant on the period of the control signal. If a dot boundary passes through an elemental area, this can be accurately represented by modifying the intensities of adjacent exposing beams. Each exposing beam has a gaussian profile while conventional record media have an additive response characteristic such that the effect of more than one pass of an exposing beam over the record medium is cumulative. Thus, by controlling the intensities of the adjacent beams, a high degree of precision can be obtained for the dot boundary position.

The system described above is constructed of an expose cylinder on which the record medium is mounted and an expose head which moves in parallel with the cylinder and carries the six beam generators.

We have developed a number of different systems in which a single light beam is caused to impinge on a mirror which rotates causing the beam to be reflected onto a record medium positioned outwardly of the mirror, rotation of the mirror causing the beam to scan across the record medium. This type of system, which is used in our Datrax system, is advantageous from the point of view of reducing the space taken up by the overall system and the amount of complex control equipment required. However, it is not possible without reintroducing complex beam control systems to use more than a single beam to scan the record medium since if two or more beams impinge on the mirror, the relative positions of the beams will interchange during a rotation of the mirror.

A further requirement which has recently been developed is for the use of recording materials which do not have an additive response characteristic, in the sense defined above, and must be exposed in a binary fashion but which have useful properties such as the ability to be used directly as a printing plate. However, their binary nature means that a single pass of the beam either causes full exposure of the record medium or no exposure.

If there is to be no loss in machine productivity, the reduction in the number of exposing beams from six to one results in an increase in the modulation rate required. One way in which the modulation rate can be decreased is to use a coarser definition for each half-tone dot area or cell. In the past, a half-tone dot area has been defined in terms of a very large number of elemental areas, for example 720. By reducing the number of elemental areas, the number of times that the control signal to the beam has to be changed is reduced and so the modulation rate is decreased. However, the coarseness of the half-tone dot area definition leads to a much coarser representation of each dot of the image. Thus, although certain dot sizes can be accurately represented since they are defined by the full exposure of an exact number of the coarse elemental areas, there is a large number of dot sizes which cannot be exactly represented. Furthermore, due to the binary requirement mentioned above, it is not possible to modulate the beam intensity in the manner of the conventional method described above to adjust the position of a dot boundary within an elemental area.

In the past, this problem has been dealt with in a number of ways. For example, where a dot size cannot be accurately represented, an approximate representation is achieved by exposing a certain number of the elemental areas which would not normally be exposed until a larger dot density was defined. However, because the same extra elemental areas are exposed each time a dot size of that particular value is required, the same approximation is always produced and this leads to the generation of artificial contours within the exposed image area. To deal with this problem, previous proposals have increased the number of elemental areas but this results in an increase in modulation rate and a return to the other problems described above.

SUMMARY OF THE INVENTION

In accordance with one aspect of the present invention, we provide a method of generating a half-tone representation of an original picture in which an exposing beam is caused to scan a record medium, the condition of the exposing beam being controlled by a two state control signal in accordance with a picture signal representing colour component densities of the original picture and half-tone dot information defining for elemental areas within a dot cell corresponding values representative of colour densities whereby elemental areas of the record medium are exposed or not exposed in accordance with the control signal taking up a first or second state respectively, the control signal being generated by:

(i) monitoring the position of the exposing beam relative to the record medium and relative to a half-tone dot area within which the beam is positioned;

(ii) comparing a picture signal representing a colour component density at that position with a half-tone dot cell value for the elemental area of a half-tone dot cell corresponding to the elemental area of the record medium at the monitored position to generate a difference signal;

(iii) determining from the difference signal and a predetermined probability function the probability that the control signal should take up its first or second state, the probability function being defined such that for a given picture signal the average proportion of a dot cell which is exposed over a region of the record medium having a plurality of half-tone dots generated in response to the picture signal will be substantially equal to the colour density represented by the picture signal expressed as a proportion of a maximum colour density; and, (iv) causing the control signal to take up its first or second state in accordance with the determined probability.

The invention enables a considerable reduction in the number of elemental areas needed to define a half-tone dot area to be achieved without any significant generation of artificial contours in the resultant half-tone representation. This is achieved by making use of a probability function which introduces a random element into the choice of elemental areas at the edge of a half-tone dot but which ensures that although each half-tone dot will not itself accurately define the required colour density, an area of such dots will on average define the required dot density with the further feature that within that area, the dots will have a variety of different shapes.

We have found that the invention enables satisfactory results to be achieved for dot areas having $12 \times 12$ elemental areas. Typically, the exposing beam will comprise a laser beam while the record medium may be any conventional medium. The invention is particularly applicable however, to a record medium having a non-additive characteristic.

A typical half-tone representation is made up of a number of colour separations so that the method described above is repeated for each colour separation, the picture signal representing the densities of the different colour components.

The magnitude of the picture signals may represent colour component density in any conventional manner and thus either directly or indirectly depending upon the apparatus which generates the picture signal. In each case, the quantity expressed by the half-tone dot cell values will correspond with the quantity expressed by the picture signal magnitudes.

The half-tone dot cell values corresponding to each elemental area of a half-tone dot cell are generally related to the position of the elemental area within the cell. This means that the values could be calculated from the coordinates of the exposing beam relative to the half-tone dot cell being exposed but conveniently the values are predetermined and stored in the form of a map which is effectively scanned in synchronism with the scanning of the exposing beam across the record medium.

The difference signal generated in step (ii) may be formed by subtracting one of the half-tone dot cell value and the picture signal magnitude from the other or by an equivalent mathematical method. For example, it is often convenient in practice for the half-tone dot cell values to be complementary to the picture signal magnitudes. In this case, the "difference" signal is formed by adding the picture signal magnitude and the half-tone dot cell value. In each case, however, the resultant value is indicative of the difference between the picture signal magnitude and the half-tone dot cell value.

Conveniently, the half-tone dot cell values correspond to picture signal magnitudes which in theory require 50% of the corresponding elemental area to be exposed to define accurately the edge of a dot corresponding to that picture signal magnitude. In this case, it is preferable if the probability function defines a probability of $\frac{1}{2}$ when the difference signal indicates that the picture signal magnitude and the half-tone dot value define the same colour component density.

Preferably, step (iv) comprises randomly generating one of two numbers corresponding to the first and second states of the control function, the random number generation being weighted by the determined probability.

In general, when a number of colour separations are to be reproduced, the angle between the exposing beam and the screen grid is different for each colour separation in order to reduce moire effects. In such a case, the probability function may differ between scanning angles.

In accordance with a second aspect of the present invention, apparatus for generating a half-tone representation of an original picture comprises an exposing beam generator; a record medium support; means for causing an exposing beam generated by the beam generator to scan a record medium mounted on the support; exposing beam control means for generating a two state control signal to control the condition of the exposing beam, the control signal being generated in accordance with a picture signal representing colour component densities of the original picture and half-tone dot information defining for elemental areas within a dot cell corresponding values representative of colour densities whereby elemental areas of the record medium are exposed or not exposed in use according to the control signal taking up a first or second state respectively, the exposing beam control means including monitoring means for monitoring the position of the exposing beam relatively to the record medium and relative to a half-tone dot area within which the beam is positioned, half-tone dot cell value generating means responsive to the position of the exposing beam relative to a half-tone dot area to generate a half-tone dot cell value for the corresponding elemental area, comparison means for comparing a picture signal representing a colour component density at that position with the half-tone dot cell value generated to generate a difference signal; and control signal generating means for generating the control signal in one of its first and second states by determining from the difference signal and a predetermined probability function the probability that the control signal should take up its first or second state, the probability function being defined such that for a given picture signal the average proportion of a dot cell which is exposed over a region of the record medium having a plurality of half-tone dots generated in response to a picture signal will be substantially equal to the colour density represented by the picture signal expressed as a proportion of a maximum colour density.

Preferably, the half-tone dot cell value generating means comprises a store containing values representative of colour densities for the elemental areas of a half-tone dot cell.

Typically, the monitoring means, comparison means, and control signal generating means will be provided by dedicated hardware components although they could be provided by a suitably programmed computer.

DESCRIPTION OF THE DRAWINGS

An example of a method and apparatus for generating a half-tone representation of an original picture will now be described with reference to the accompanying drawings, in which:

FIG. 1 is a schematic block diagram of part of the apparatus;

FIGS. 2A-2C illustrate part of the half-tone dot area map of FIG. 1 and two examples of half-tone dots respectively;

DETAILED DESCRIPTION OF AN EMBODIMENT

Figure 2A:
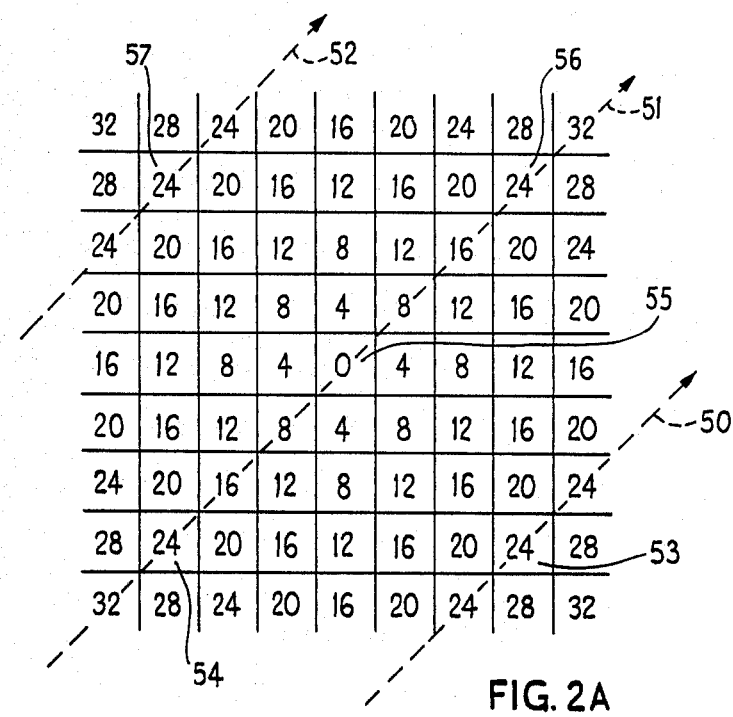

The apparatus shown in FIG. 1 may form part of an otherwise conventional half-tone representation generating apparatus such as our Datrax system. The apparatus comprises a store 1 defining a square map of 3600 locations, a central part of which is shown in FIG. 2A. This map defines a half-tone dot area in terms of high resolution elemental areas arranged in shells with the areas of each shell being associated with colour density component values expressed in this example as parts in 240. Of course other representations, such as dot percentages, of colour component density could be used. The map is addressed by X and Y address generators 2, 3 which track the position of a laser spot on a record medium as the spot scans through each dot area on the medium.

The store 1 is connected to an adder circuit 4 such that the inverse of the addressed value from the store 1 ($-PV$) is applied to the adder 4. In addition, a picture signal (PS) from a store (not shown) is applied to the other input of the adder 4. The picture signal defines a colour density value for the colour component corresponding to the separation being generated in terms of a part in 240 and for the particular pixel of the original picture which is being recorded. Typically each pixel will correspond to one quarter of a half-tone dot area.

The output signal from the adder circuit 4 is fed to a control signal generator 5, to be explained below, which generates a two state control signal (CS) on a line 6 to a beam modulator 7.

A laser 8 generates a coherent laser beam which is fed to the modulator 7. When the control signal (CS) is binary zero, the modulator 7 is caused to deflect the incoming laser beam in the direction indicated by the arrow 9 in FIG. 1. When the control signal is a binary 1 the beam modulator 7 causes the laser beam to impinge on a rotatable mirror 10 where it is reflected onto a record medium mounted on a support 11. The mirror 10 rotates to cause the beam to scan across the surface of the record medium on the support 11 while the support 11 tracks parallel with the mirror 10 to enable the beam to scan the full width of the record medium. The position on the record medium at which the beam impinges is continuously monitored in a conventional manner by monitoring the position of the mirror 10 and the support 11. The location of impingement of the beam is represented by X and Y values.

An example of the content of the central portion of the map in the store 1 is illustrated in FIG. 2A. In this example, it is assumed that the picture signal PS has been normalized to vary between 0 and 240. The colour component density values stored in the map shown in FIG. 2A indicate values for the picture signal PS which would require 50% of the corresponding high resolution elemental area on the record medium to be exposed.

In this method, half-tone dots are formed on the record medium from low resolution elemental areas, larger than those of the elemental areas of the map. Thus, in use, the X,Y address generators 2, 3 generate addresses of high resolution areas of the map which are spaced apart and correspond to the current position of impingement of the beam on the record medium.

For example, where the scanning direction is at 45° to the screen grid, as shown by arrows 50-52 in FIG. 2A (the simplest case) the values in the map may be sampled at positions 53-57 within that part of the map shown. Thus, following a sampling step the control signal is continuously operated in the resultant state until the next sampling step leading to relatively large or coarse elemental areas being formed on the record medium.

Figure 5:
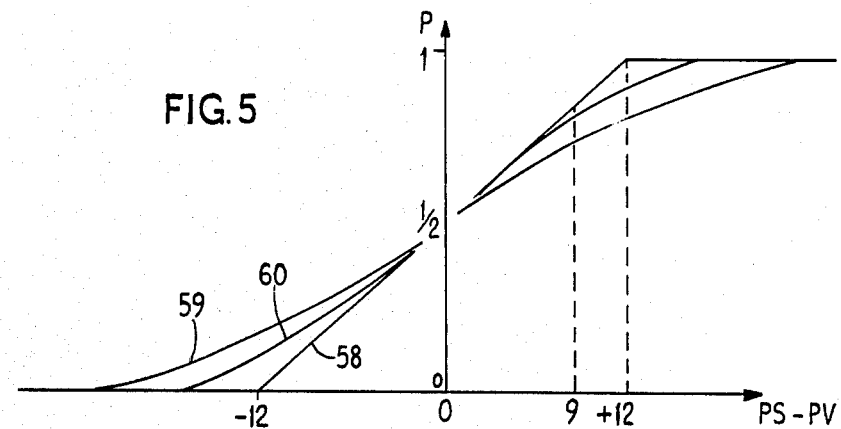

In operation, the picture signal PS is fed to the adder circuit 4 along with the corresponding colour density value sampled form the map 1. In the adder 4, the difference between the picture PS and the map value PV is determined. The difference signal resulting from the adder circuit 4 is then fed to the control signal generator 5 which contains a look up table (LUT) defining a probability function indicated by a line 58 in FIG. 5. Consider a picture signal PS with a value of 33. This is fed to the adder circuit 4 and each sampled value from the map is subtracted from the picture signal to generate a resultant, difference signal. For the scan line indicated by the line 51 in FIG. 2A, as the position of the exposing beam on the record medium reaches a position within a half-tone dot cell corresponding to the position 54 in the map, the signal PV applied to the adder circuit 4 is changed to "24". This is subtracted from the picture signal leaving a value of "9" and this value is applied to the look up table. As can be seen in FIG. 5, if PS=PV then there is a probability (P) of ½ that the coarse elemental area on the record medium should be exposed to the exposing beam. Since the difference PS-PV is 9, the probability is about ⅝ that this should occur and the elemental area may or may not be exposed. At the next sampling position 55, the difference PS-PV is 33 (since PV=0) and when this difference is applied to the look up table, the probability is found to be equal to one. Thus, this elemental area is exposed. In a similar manner, when the exposing beam reaches a position corresponding to the elemental area 56 in the map, the process is repeated and the probability of ⅝ is determined. Since the coarse elemental areas are substantially square shaped, the next pass of the exposing beam through the same half-tone dot cell will be along one of the lines 50, 52 which it will be noted in FIG. 2A are spaced by about four of the high resolution elemental areas.

The probability function does not decide which of the coarse elemental areas is exposed when 0<P<1 but arranges that over an area of the half-tone representation, the mean dot percentage corresponds to the picture signal. Examples of two dot shapes that might be produced from the same picture signal PS are shown in FIGS. 2B and 2C. Each elemental area in FIG. 2B or FIG. 2C corresponds to about four or five of the elemental areas in FIG. 2A. Further circuitry, to be explained below, within the control signal generator 5 determines which coarse elemental areas are to be exposed in this situation.

Figure 3:
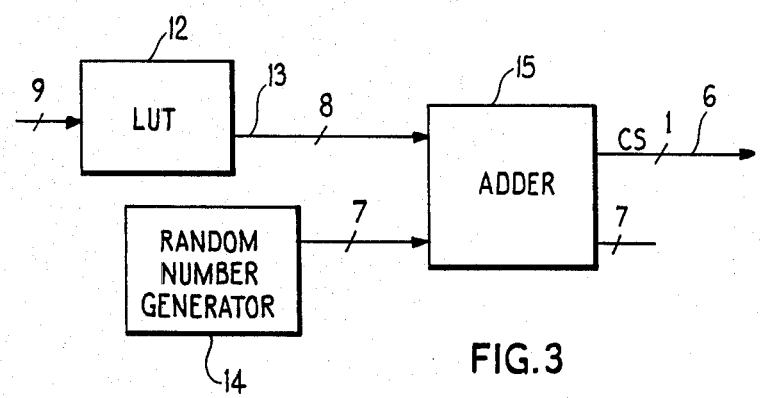
FIGS. 3 and 4 are block diagrams of two examples of control signal generators; and, FIG. 5 illustrates graphically three probability functions.

An example of a control signal generator 5 is shown in FIG. 3. This comprises a probability function look up table (LUT) 12 to which the signal from the adder circuit 4 is fed. The LUT 12 contains probability values for each of the possible values of the signal from the adder circuit 4 corresponding to the line 58 in FIG. 5. In a case where the scanning direction is at 45° to the screen grid (as shown in FIG. 2A), the relationship between the probability function and the signals from the adder circuit 4 will be linear. For other angles between the scanning directions and the screen grid, the function will be non-linear as illustrated by line 59 (90°) and 60 (15° and 75°). It should be noted also in these cases that the map (FIG. 2A) will be scanned in correspondingly different directions.

The signal from the adder circuit 4 addresses the LUT 12 which generates on a line 13 a probability value which for example may range from zero indicating that the spot position is well outside the dot boundary and 128 (equivalent to a probability of one) indicating that the spot position is well within a dot boundary. By "well outside" and "well within" we mean that the spot position is spaced by more than a spot diameter (equivalent to a coarse elemental area) from the ideal position of the dot boundary.

The control signal generator also comprises a random number generator 14 of a conventional form which generates random numbers varying in the range 0–127. It will be seen therefore that the numbers from the random number generator 14 can be represented by a maximum of seven bits whereas the numbers from the LUT 12 require a maximum of eight bits. The two numbers are fed to an adder 15 where they are added and result in a number having up to eight bits. The most significant bit (MSB) is fed along the line 6 as the control signal while the remaining seven bits are discarded.

Consider first the case where the spot is well within the dot boundary. In this case, the probability is certainty that the coarse elemental area on the record medium should be exposed. The LUT 12 will thus generate a signal having the value 128 which is fed to the adder 15. This signal requires eight bits to be represented with the MSB set at one. Irrespective of the number generated by the number generator 14, the MSB of the output value will be one. Thus, the modulator 7 will be controlled to cause the beam to expose the record medium.

If the spot is well outside a dot boundary then the probability that this region of the record medium should be exposed is zero. The LUT 12 will thus output a value of zero to the adder 15. Since the random number generator 14 only generates values requiring seven bits to be represented, the output signal will also only have a maximum of seven bits and the MSB of this output signal (the eighth bit) will always be zero. Thus, the modulator 7 will be controlled to deflect the laser beam away from the mirror 10 and the record medium will not be exposed.

Between these extreme values, the signal generated by the LUT 12 will be representative of the probability. The more probable it is that the elemental areas should be exposed, the larger the signal. It will be appreciated therefore that in conjunction with the random numbers from the generator 14 an output signal will be generated having an MSB which will vary in accordance with the input probability value.

Figure 4:
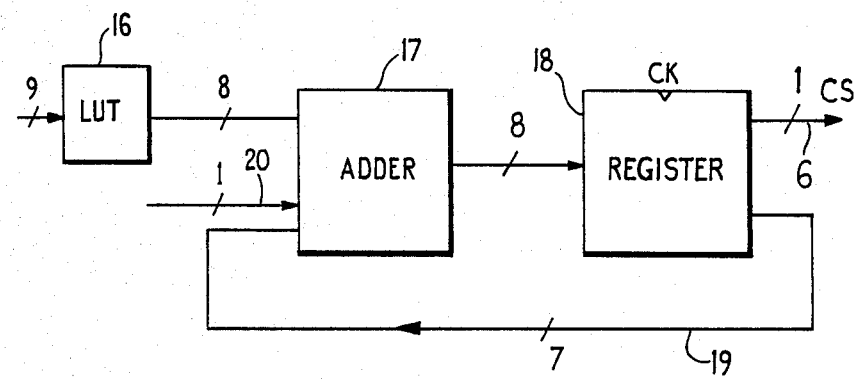

The generator described and shown in FIG. 3 is preferred but an alternative generator is illustrated in FIG. 4. In this case, the signal from the adder circuit 4 is once again fed to a probability function LUT 16 similar to the LUT 12. The probability value output from the LUT 16 is fed to an adder 17. The output of the adder 17 which has a maximum of eight bits is fed to a register 18 where it is clocked through so that the MSB of the stored value is fed along the line 6 to constitute the control signal while the seven least significant bits are fed along a line 19 back to the adder 17. The bits fed along the line 19 are added to a MSB of zero applied on a line 20. This means that the value from the LUT 16 is always added to a value represented by eight bits, the MSB of that value being zero. As in the previous example, this will mean that the MSB of the resulting value will be one when the probability value from the LUT is 128 (certainty) and zero when the signal from the LUT 16 (is 0). For intermediate values, the adder 17 acts on a similar principle to the adder 15.

Although the control signal generator 5 is shown as made up of a number of circuit elements, the functions performed by these elements could be performed by a suitably programmed computer. In addition, the map 1 which will typically comprise a store could be replaced by an algorithm which calculates the map values from the X and Y values.

It should be appreciated that the exposure/nonexposure condition used above could be inverted.

I claim:

1. A method of generating a half-tone representation of an original picture in which an exposing beam is caused to scan a record medium, the condition of said exposing beam being controlled by a two state control signal in accordance with a picture signal representing colour component densities of said original picture and half-tone dot information defining for elemental areas within a dot cell corresponding values representative of colour densities whereby elemental areas of the record medium are exposed or not exposed in accordance with said control signal taking up a first or second state respectively, said control signal being generated by:
   (i) monitoring the position of said exposing beam relative to said record medium and relative to a half-tone dot area within which said beam is positioned;
   (ii) comparing a picture signal representing a colour component density at the said position with a half-tone dot cell value for the elemental area of a half-tone dot cell corresponding to the elemental area of said record medium at the said monitored position to generate a difference signal;
   (iii) determining from said difference signal and a predetermined probability function the probability that said control signal should take up its first or second state, said probability function being defined such that for a given picture signal the average proportion of a dot cell which is exposed over a region of said record medium having a plurality of half-tone dots generated in response to said picture signal will be substantially equal to the colour density represented by said picture signal expressed as a proportion of a maximum colour density; and,
   (iv) causing said control signal to take up its first or second state in accordance with said determined probability.

2. A method according to claim 1, wherein said exposing beam comprises a laser beam.

3. A method according to claim 1 wherein step (iv) comprises randomly generating one of two numbers corresponding to the first and second states of said control function, said random number generation being weighted by said determined probability.

4. A method according to claim 1 for reproducing a number of colour separations in which the angle between said exposing beam and said screen grid is different for each colour separation, wherein said probability function differs between scanning angles.

5. Apparatus for generating a half-tone representation of an original picture, said apparatus comprising an exposing beam generator; a record medium support; means for causing an exposing beam generated by said beam generator to scan a record medium mounted on said support; exposing beam control means for generating a two state control signal to control the condition of said exposing beam, said control signal being generated in accordance with a picture signal representing colour component densities of said original picture and half-tone dot information defining for elemental areas within a dot cell corresponding values representative of colour densities whereby elemental areas of said record medium are exposed or not exposed according to said control signal taking up a first or second state respectively, the exposing beam control means including monitoring means for monitoring the position of said exposing beam relatively to said record medium and relative to a half-tone dot area within which said beam is positioned, half-tone dot cell value generating means responsive to the position of said exposing beam relative to a half-tone dot area to generate a half-tone dot cell value for the corresponding elemental area, comparison means for comparing a picture signal representing a colour component density at that position with the half-tone dot cell value generated to generate a difference signal; and control signal generating means for generating said control signal in one of its first and second states by determining from said difference signal and a predetermined probability function the probability that said control signal should take up its first or second state, said probability function being defined such that for a given picture signal the average proportion of a dot cell which is exposed over a region of said record medium having a plurality of half-tone dots generated in response to a picture signal will be substantially equal to the colour density represented by said picture signal expressed as a proportion of a maximum colour density.

6. Apparatus according to claim 5, wherein said half-tone dot cell value generating means comprises a store containing values representative of colour densities for the elemental areas of a half-tone dot cell.

7. Apparatus according to claim 5, wherein said control signal generating means comprises a probability function look-up table addressed by the said difference signal; a random number generator for generating signals representing random numbers having a minimum number of digits which is one less than the maximum number of digits generated by said look-up table; and an adder circuit for adding said signals from said look-up table and said random number generator and for providing an output constituted by the most significant bit of the result of said addition to constitute said control signal.

* * * * *

UNITED STATES PATENT AND TRADEMARK OFFICE
CERTIFICATE OF CORRECTION

PATENT NO. : 4,821,109

DATED : April 11, 1989

INVENTOR(S) : Malcolm D.M. Roe

It is certified that error appears in the above-identified patent and that said Letters Patent is hereby corrected as shown below:

On the first page of the patent, after "[73]" delete "Wisconsin Alumni Research Foundation, Madison, Wis." and insert --Crosfield Electronics Limited, London, England--

Signed and Sealed this

Ninth Day of October, 1990

Attest:

HARRY F. MANBECK, JR.

*Attesting Officer*   *Commissioner of Patents and Trademarks*